(12) United States Patent
Versteegh et al.

(10) Patent No.: US 9,371,820 B2
(45) Date of Patent: Jun. 21, 2016

(54) DIRECT DRIVE WIND TURBINE WITH SLIP RING

(75) Inventors: Cornelis Johannes Antonius Versteegh, Hilversum (NL); Gerard Albert Jacobus Treur, Amersfoort (NL)

(73) Assignee: XEMC VWEC B.V., Hilversum (NL)

( * ) Notice: Subject to any disclaimer, the term of this patent is extended or adjusted under 35 U.S.C. 154(b) by 562 days.

(21) Appl. No.: 13/983,961

(22) PCT Filed: Feb. 5, 2012

(86) PCT No.: PCT/EP2012/000509
§ 371 (c)(1),
(2), (4) Date: Oct. 9, 2013

(87) PCT Pub. No.: WO2012/107192
PCT Pub. Date: Aug. 16, 2012

(65) Prior Publication Data
US 2014/0294568 A1    Oct. 2, 2014

(30) Foreign Application Priority Data

Feb. 7, 2011   (EP) .................................... 11000939

(51) Int. Cl.
*F03D 9/00* (2016.01)
*F03D 11/00* (2006.01)
*F03D 11/02* (2006.01)

(52) U.S. Cl.
CPC ............ *F03D 9/002* (2013.01); *F03D 11/0066* (2013.01); *F03D 11/028* (2013.01); *Y02E 10/722* (2013.01)

(58) Field of Classification Search
None
See application file for complete search history.

(56) References Cited

U.S. PATENT DOCUMENTS

| 4,039,848 | A | * | 8/1977 | Winderl ................ F03D 1/025 290/55 |
|---|---|---|---|---|
| 6,774,504 | B1 | | 8/2004 | Lagerwey |
| 7,075,192 | B2 | | 7/2006 | Bywaters |
| 7,109,600 | B1 | | 9/2006 | Bywaters |
| 7,161,259 | B2 | | 1/2007 | Lagerwey |
| 7,183,665 | B2 | | 2/2007 | Bywaters |
| 7,431,567 | B1 | | 10/2008 | Bevington |
| 7,891,941 | B2 | | 2/2011 | Bevington |
| 8,308,430 | B2 | | 11/2012 | Bevington |
| 8,454,309 | B2 | | 6/2013 | Bevington |

FOREIGN PATENT DOCUMENTS

WO      2005103489      11/2005

OTHER PUBLICATIONS

International Search Report and Written Opinion of corresponding European Patent Application PCT/EP2012/000509, filed Feb. 5, 2012.

* cited by examiner

*Primary Examiner* — Ninh H Nguyen
*Assistant Examiner* — Justin Seabe
(74) *Attorney, Agent, or Firm* — Steven M. Koehler; Westman, Champlin & Koehler, P.A.

(57) ABSTRACT

A direct-drive wind turbine includes a tower with a nacelle having a direct-drive generator and a rotatable hub carrying turbine blades, wherein the direct-drive generator comprises an outer stator and an inner rotor and has a first side facing the turbine blades and a second side facing away from the turbine blades. A slip ring at the second side transfers power and/or signals from the nacelle to the rotatable hub being mounted coaxially with the centerline of the direct-drive generator. The slip ring mounts on a first arm. An end of a second arm distal to the slip ring can engages the rotor or a shaft. The assembly of the first arm, slip ring and second arm may be at a first position where the slip ring is aligned with the centerline of the direct drive generator and at a second position to provide access to the hub.

19 Claims, 5 Drawing Sheets

DIRECT DRIVE WIND TURBINE WITH SLIP RING

CROSS-REFERENCE TO RELATED APPLICATION

This application is a Section 371 National Stage Application of International Application PCT/EP2012/000509 filed Feb. 5, 2012 and published as WO2012/107192 A2 in English.

BACKGROUND

The discussion below is merely provided for general background information and is not intended to be used as an aid in determining the scope of the claimed subject matter.

Aspects of the present invention relate to a direct-drive wind turbine comprising a tower with a nacelle, said nacelle being provided with a direct-drive generator and a rotatable hub carrying turbine blades, wherein the direct-drive generator comprises an outer stator and an inner rotor and has a first side facing the turbine blades and a second side facing away from the turbine blades, the nacelle further being provided with a slip ring for transferring power and/or signals from the nacelle to the rotatable hub, said slip ring being mounted coaxially with the centerline of the direct-drive generator.

A hub carrying turbine blades requires power, for example for powering pitch motors, various sensors (such as sensors measuring the pitch of a turbine blade), etc. This requires one or more electrical connections between the stationary world (the tower with the nacelle) and the rotatable hub. This function is performed by a slip ring. For direct-drive generators, access to the hub is provided via the hollow center of the generator, or via a bypass. The latter is inconvenient because it is dangerous for maintenance personal and adds significant additional cost. The first option is problematic for those direct-drive generators that have an inner rotor, as a result of which the inside wall of the direct-drive generator is not part of the stationary world. This is in particular the case for direct-drive turbines that have bearings at both the first and the second end of the direct-drive generator. More specifically the problem is that the placement of the slip ring at the second end would block the passage through the direct-drive generator, and placement of the slip ring at the first end requires a long frame extending through the hollow axis of direct-drive generator, which is a burden in view of the required co-axial placement of the slip ring. Such a frame would have to be very rigid, bulky and heavy to meet the alignment requirements.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is to provide a construction that allows passage through the hollow rotor of the direct-drive generator without increasing the design requirements for accurate co-axial alignment with the centerline of the direct-drive generator.

To this end, a direct-drive wind turbine according to the preamble is characterized in that the slip ring is provided at the second side of the direct-drive generator and is mounted on a first arm, the slip ring further being provided with a second arm, wherein an end of said second arm distal to the slip ring is capable of being engaged by an element chosen from i) a shaft connecting the rotor of the direct drive generator to the hub, and ii) the rotor of the direct drive generator, wherein the assembly of first arm, slip ring and second arm can be at a first position in which the slip ring is aligned with the centerline of the direct drive generator and at a second position in which the slip ring is not aligned with the centerline of the direct drive generator to provide access to the hub, wherein the direct-drive wind turbine is provided with a mounting support capable of guiding the assembly from a third position that is away from the first position to the first position.

Thus, in case of maintenance, the hub can be accessed by moving the assembly from the first position, thus clearing the passage through the hollow direct-drive generator. After maintenance, the assembly is moved back again, without re-alignment of the axes of the slip ring and the direct-drive generator being required thanks to the guiding of the assembly from the third position to the first position by the mounting support. The second and third position may be the same, in which case the assembly is guided over the entire distance from the second position to the first position. According to a simple embodiment, the stationary part of the generator is provided with two upright, diametrically opposed pins and the first arm is provided with holes at either end receiving said pins. The pins guide the first arm, seating the assembly in the first position. To engage the second arm, the distal end may comprise a guiding slot and the rotor may be provided with a pin capable of being received in the guiding slot. The guiding slot will accommodate for minor deviations in the coaxial alignment of the axis of rotation of the slip ring and of the rotor of the direct-drive generator.

According to one embodiment, the first arm is a swing arm that is capable of being swung clear by rotating about an axis located at an end of the first arm opposite of the slip ring.

After maintenance, the swing arm is swung back again, without re-alignment of the axes of the slip ring and the direct-drive generator being required. This guides the assembly over the entire path from the second position all the way to the first position. As an additional benefit, the maintenance worker doesn't have to lift the full weight of the assembly.

According to another embodiment, the axis of the first swing arm is affixed to a stationary part of the direct-drive generator.

The stationary part is the stator of the direct-drive generator or the housing thereof. This reduces the length of the arm and thus avoids compromising the accuracy of the co-axial alignment of the centerlines of the rotor of the direct-drive generator and the slip ring.

According to one embodiment, the axis about which the first arm can swing tilts towards the hub, allowing the first arm to move towards the hub by gravity, and the first arm is blocked by a stop.

This provides a very reliable method of keeping the slip ring at the desired first position, even in case a locking means such as a safety catch fails. The stop or the first arm may be provided with a bolt to allow adjustment of the position of the slip ring. The stop may be in the form of a short arm, that in itself does not impede a person from access to the hub. The short arm will be fixed to the stationary world, e.g. the housing of the generator.

According to one embodiment, gravity assists in keeping the slip ring away from the centerline of the generator if the slip ring has been swung clear.

This is, for example, achieved if the swing arm can swing over more than 90°.

According to another embodiment, the first arm is at an angle to a horizontal plane −30° to 30°.

That is, the arm is substantially horizontal. This reduces the effect of the weight of the combination of the first arm, the slip ring and the second arm, making it easier to swing aside, or swing back after maintenance.

According to yet another embodiment, the swing arm is provided with an electrical connector leading to the slip ring and the second arm is provided with an electrical counter connector for the electrical connector.

This allows, in case of maintenance, maintenance staff to plug the electrical counter connector of the stationary world into the electrical connector of the hub. Thus, by way of example, the turbine-blade driven section can be powered in case of maintenance, e.g. to check the operation of a pitch motor. The electrical connector may be female, in which case the electrical counter connector is male, or vice versa. By way of example, there is a data connection cable in the stationary world that has a first female connector. The first arm will have a first male counter connector that is connected, via the slip ring, with a second female connector. This second female connector will be connected to a second male counter connector of the rotating world. During maintenance, the first female connector may be connected to the second male counter connector and the swing arm can be moved out of the way. Power supplying connectors will be female, for reasons of safety.

According to another embodiment, the first arm is provided with a sensor for measuring the rotational speed of the rotor of the direct-drive generator.

The sensor, such as a revolutions counter, may be used to detect the presence or absence of the first arm, and hence the slip ring, e.g. in case the means locking the first arm fail.

According to one embodiment, the first arm is locked in a co-axially aligned state.

This helps to ensure reliable operation of the slip ring, even after long periods of vibration, as will occur in the nacelle.

According to yet another embodiment, the rotor of the direct-drive turbine is provided with a floor, and a cable towards the hub is guided below the floor.

This helps to provide a clear and safe passage for maintenance personnel.

BRIEF DESCRIPTION OF THE DRAWINGS

Aspects of the present invention will now be illustrated with reference to the drawing where.

DETAILED DESCRIPTION OF THE
ILLUSTRATIVE EMBODIMENT

Figure 1:
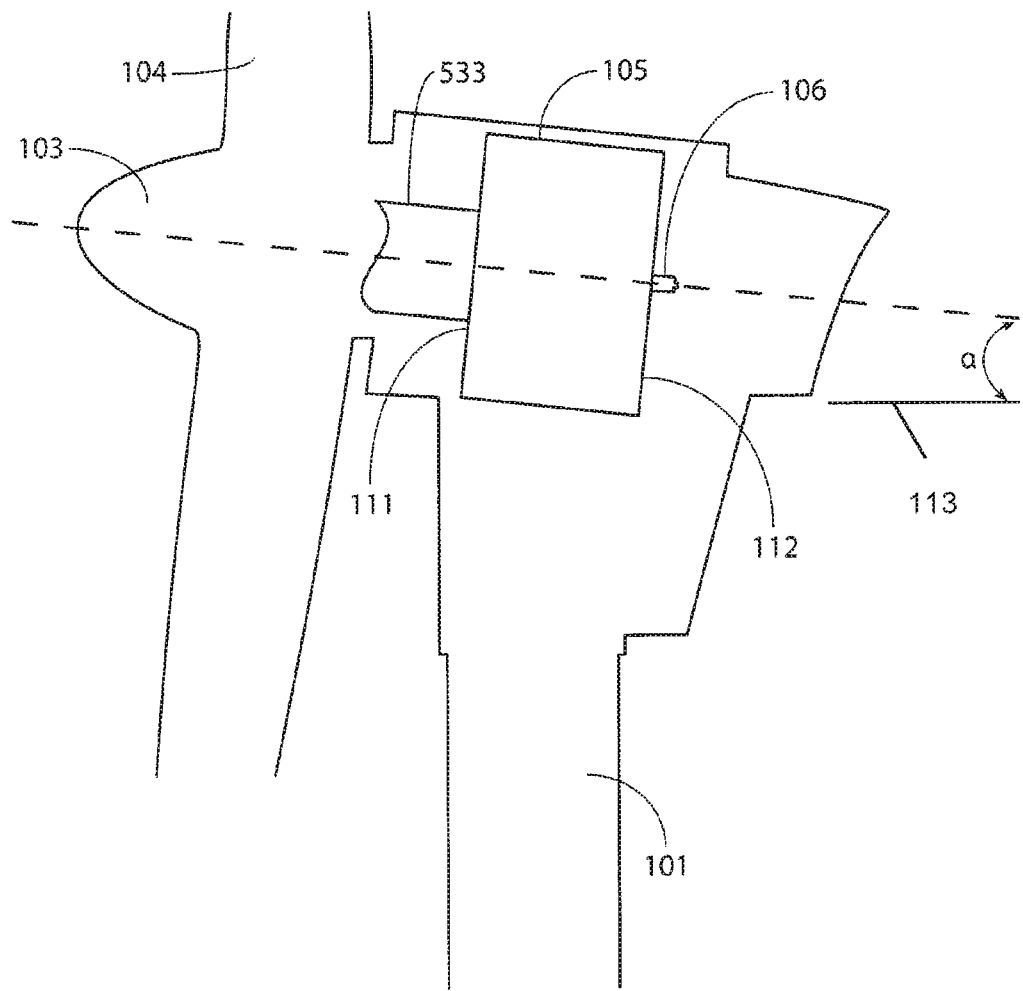
FIG. 1 is a side view of a direct-drive wind turbine with the nacelle being cut open.

FIG. 1 shows a direct-drive wind turbine 100 comprising a tower 101, a nacelle 102 supported by the tower 101. The nacelle 102 carries a hub 103 with turbine blades 104, the hub 103 capable of driving a generator 105. As is customary, the axis of rotation of the hub 103 and the generator 105 are at an angle with a horizontal plane 113, in this case 6°. The generator has a first side 111, facing the hub 103, and a second side 112 facing away from the hub 103. In accordance with an aspect of the present invention, a slip ring 106 is provided at the second side 112.

Figure 2A:
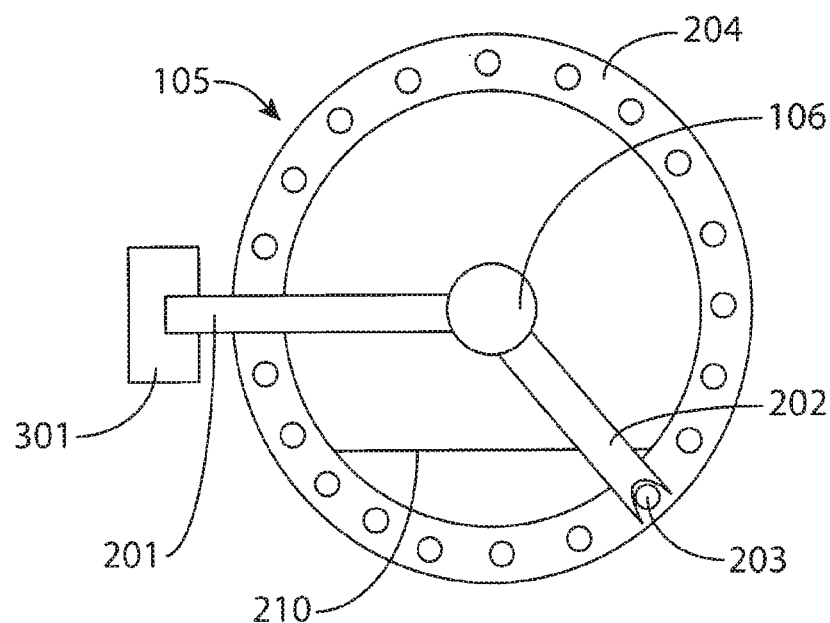
FIGS. 2*a* and 2*b* are schematic rear views from the nacelle of the wind turbine of FIG. 1 showing a direct-drive generator with a slip ring mounted with the slip ring of FIG. 1 in a first and second position, respectively.
Figure 2B:
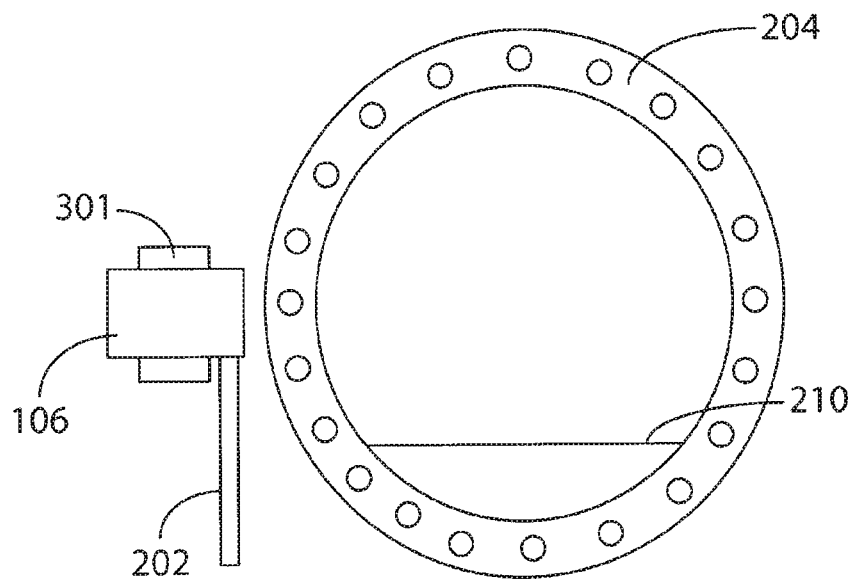

FIGS. 2*a* and 2*b* show the slip ring 106 of FIG. 1 from the nacelle 102. It is mounted on a first arm 201 capable of being swung aside (FIG. 2*b*). The slip ring 106 is provided with a second arm 202 that engages a pin 203 on the rotor 204 of the generator 105. When the rotor 204 rotates, the second arm 202 rotates along with it. A floor 210 is provided allowing an even surface for the maintenance worker. Cables to the second arm 202 may be passed below the floor 210, improving worker safety.

Figure 3:
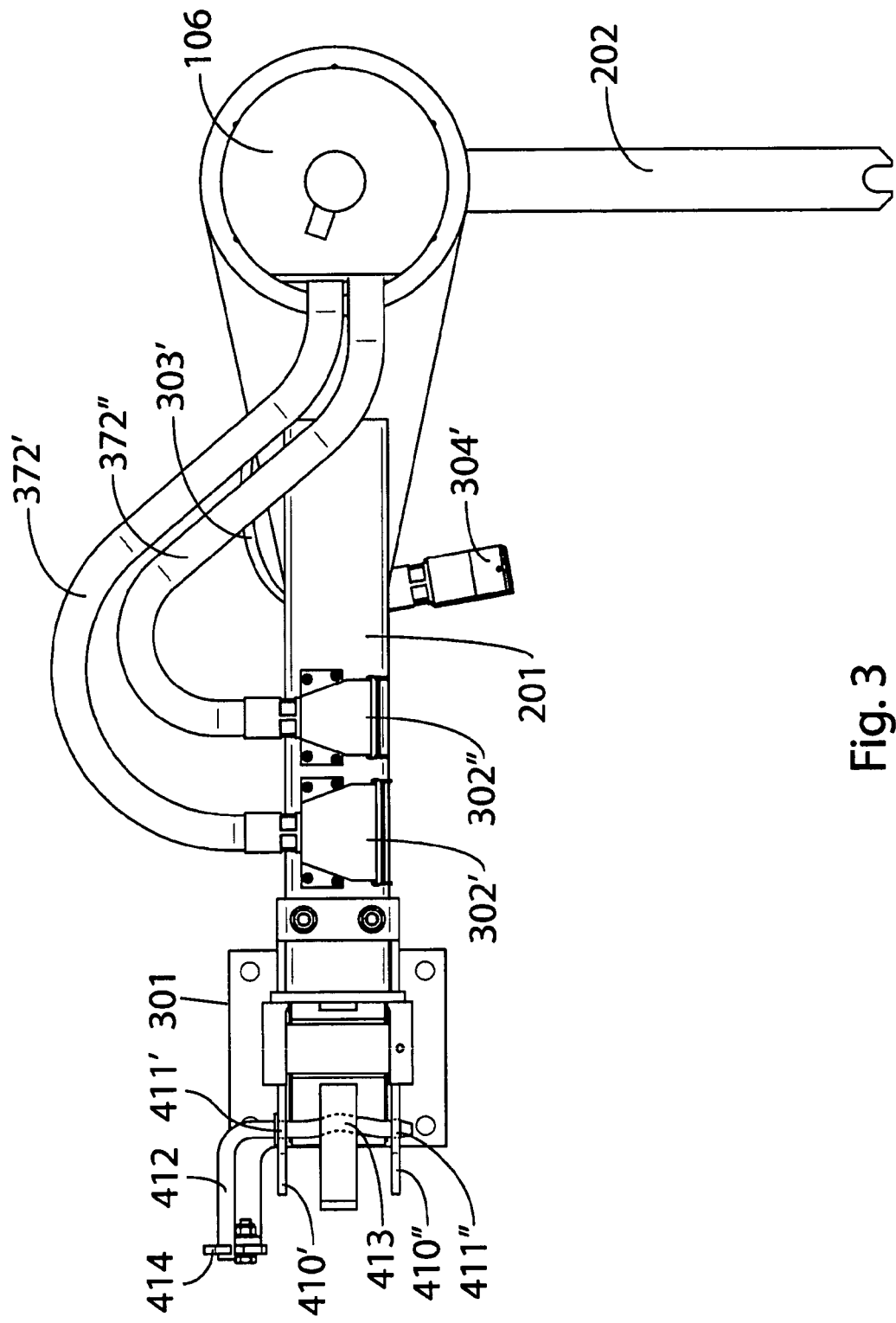
FIG. 3 shows a detailed rear view of the slip ring of FIG. 2*a*.
Figure 4:
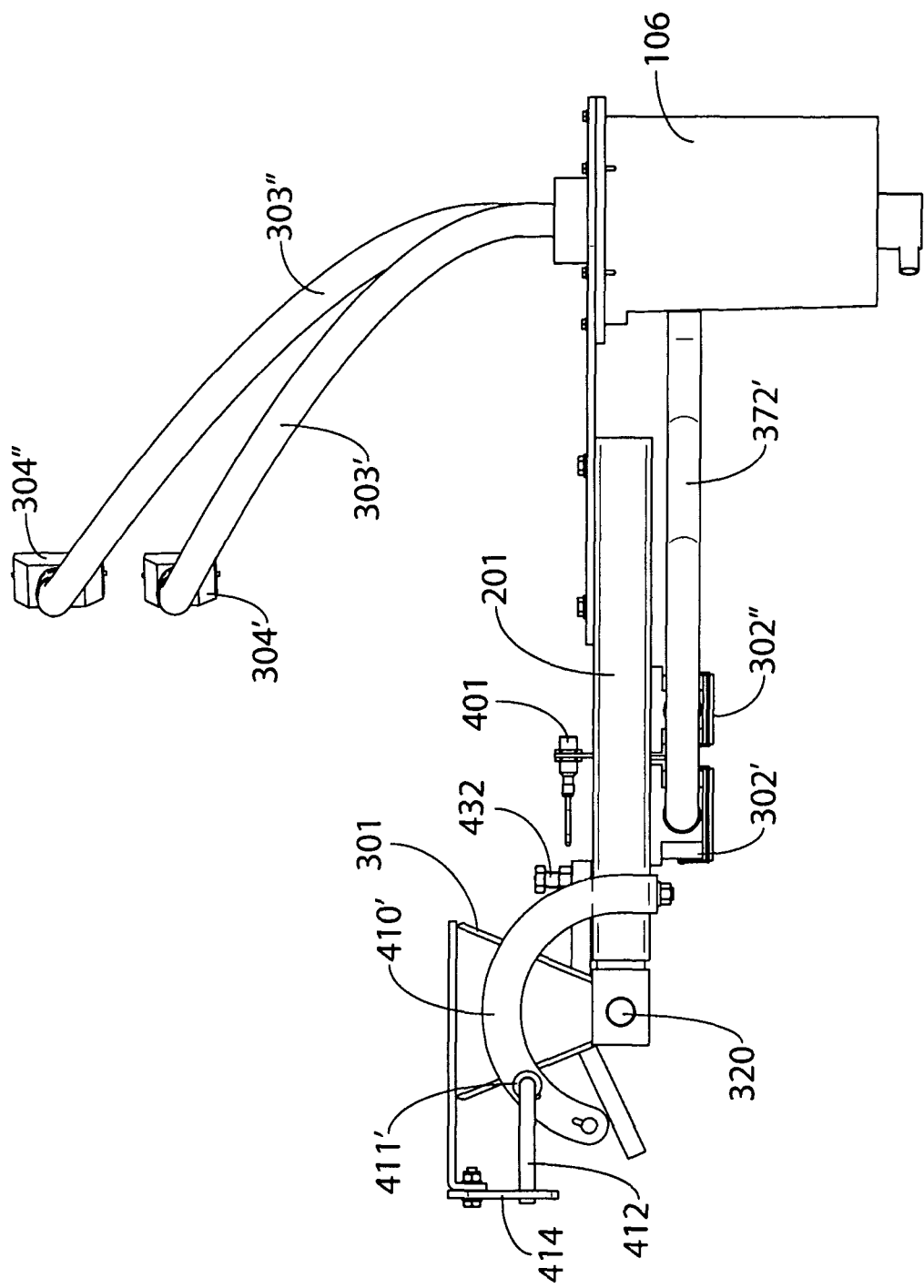
FIG. 4 shows a detailed top view of the slip ring of FIG. 3 in a first position.

FIG. 3 shows a detailed rear view of the slip ring 106 of FIG. 2*a*. It shows the first arm 201 being mounted on a mounting support 301, and rotatable about an axis 320 (see FIG. 4). The first arm 201 is provided with connectors 302 of cables 372 for connecting power and data cables (not shown) to the slip ring 106. It should be noted in the figures primes and double-primes associated with a reference number denote a first and second occurrence, respectively, of the element associated with the reference number.

There are also cables 303 with connectors 304 (FIG. 4) for passing said power and data to corresponding cables (not shown) leading into and co-rotating with the hub 103.

The first arm 201 is provided with a sensor 401 capable of detecting pins 203, which give an indication of the number of rotations per minute of the rotor 204 of the generator 105.

To lock the arm 201 and hence the slip ring 106 in a first position in which the slip ring 106 and the axis of rotation of the rotor 204 are aligned, the first arm 201 is provided with two curved auxiliary arms 410 with holes 411. A locking pin 412 is inserted into the holes 411 at one side of the mounting support 301 to lock the first arm 201 in the first position and at an opposite side of the mounting support 301 to lock the first arm 201 into the second position in which the slip ring 106 doesn't block the access through the generator 105 (FIG. 2*b*). The locking pin 412 has an off-center protrusion 413, as a result of which rotating the locking pin 412 will push the curved auxiliary arm 410 against the mounting support 301. The locking pin 412 is held in place by safety catch 414.

To free the path to the hub 103, the safety catch 414 is lifted, allowing rotation of the locking pin 412 which is subsequently taken out of the holes 411. The first arm 201 is now rotated to the second position, the locking pin 412 is introduced back into the holes 411, as a result of which the first arm 201 will remain locked in the second position. To bring the slip ring 106 into the first position, repeat these steps in reverse, making sure the second arm 202 engages one of the pins 203 on the rotor 204 of the generator 105. If you do that, the slip ring 106 is aligned, and does not need further alignment, because the first arm 201 has a fixed length. That is not to say that the first arm 201 can't benefit from adjusting its length, or more generally, the distance between the mounting support 301 and the slip ring 106, because this may be convenient the first time the slip ring 106 is aligned. The first position is determined by a stop 432, which may be provided as a screw to provide first-time adjustment.

Figure 5:
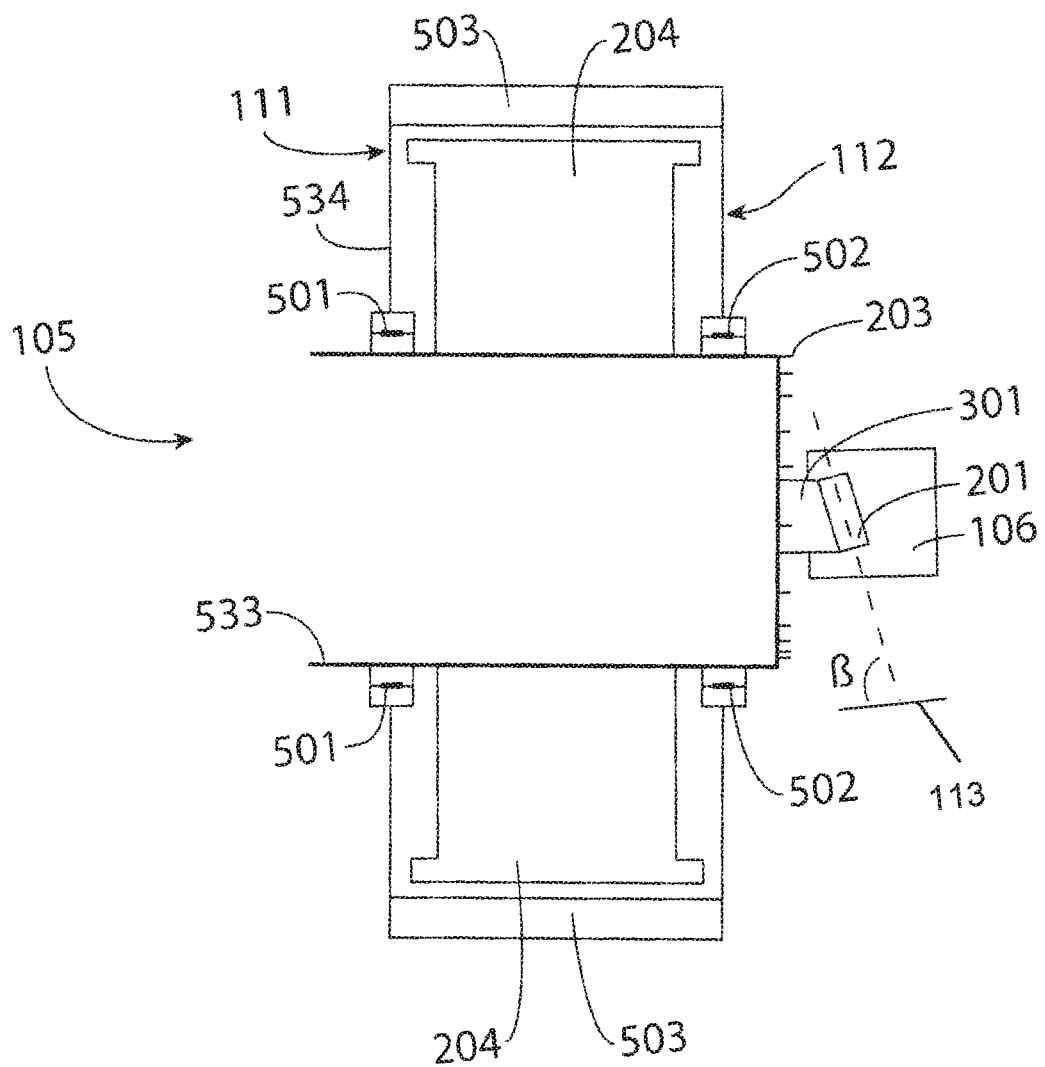
FIG. 5 shows a side view of an alternatively mounted slip ring.

FIG. 5 shows a schematic cross-sectional view of an alternative embodiment of a mounted slip ring 106 (in the first position), the axis 320 for swinging the first arm 201 being at an angle, β, of 80° with respect to the horizontal plane 113. Thus gravity can help to maintain the slip ring 106 maintain its first position.

The present invention is in particular suitable for generators with bearings at opposite sides of the generator. The bearings 501 and 502 mounted on a shaft 533 (which is connected to the hub 103) are indicated, together with generator housing 534, the rotor 204 and stator 503 of the generator 105.

The invention as discussed above may be varied in any of several ways within the scope of the appending claims. For example, magnets may be used to keep the assembly in the first position. The slip ring may be provided with a counter-weight or another second arm to counter-balance wobbling or vibrations.

The invention claimed is:

1. A direct-drive wind turbine comprising a tower with a nacelle, said nacelle being provided with a direct-drive generator and a rotatable hub carrying turbine blades, wherein the direct-drive generator comprises an outer stator and an inner rotor assembly comprising a rotor and a shaft connecting the rotor to the rotatable hub, said nacelle having a first side facing the turbine blades and a second side facing away from the turbine blades, the nacelle further being provided with a slip ring for transferring power and/or signals from the nacelle to the rotatable hub, said slip ring being mounted coaxially with a centerline of the direct-drive generator at the second side of the direct-drive generator and is mounted on a first arm, the slip ring further being provided with a second arm, wherein an end of said second arm distal to the slip ring is configured to engage an element of the rotor assembly, wherein the first arm, the slip ring and the second arm are supported by a mounting support configured to move the first arm, the slip ring and the second arm to a first position in which the slip ring is aligned with the centerline of the direct drive generator and to a second position in which the slip ring is not aligned with the centerline of the direct drive generator to provide access to the hub, wherein the mounting support guides the assembly from a third position that is away from the first position to the first position, wherein the third position is between the first position and the second position for movement from the first position to the second position.

2. The direct-drive wind turbine according to claim 1, wherein the first arm is a swing arm configured to rotate about an axis located at an end of the first arm opposite of the slip ring.

3. The direct-drive wind turbine according to claim 2, wherein the first swing arm is affixed to a stationary part of the direct-drive generator such that the axis is stationary.

4. The direct-drive wind turbine according to claim 2, wherein the first arm is affixed to the stationary part such that the axis is tilted and the first arm moves towards the hub by gravity, and the first arm is blocked by a stop.

5. The direct-drive wind turbine according to claim 4, wherein the first arm, the slip ring and the second arm are configured such that gravity assists in keeping the slip ring away from the centerline of the generator if the slip ring is moved from the first position.

6. The direct-drive wind turbine according to claim 1, wherein the first arm is configured to extend at an angle in a range of −30° to 30° with respect to a horizontal plane.

7. The direct-drive wind turbine according to claim 2, wherein the first swing arm is provided with an electrical connector leading to the slip ring and the second arm is provided with an electrical counter connector configured to connect to the electrical connector.

8. The direct-drive wind turbine according to claim 1, wherein the first arm is provided with a sensor configured to measure a rotational speed of the rotor of the direct-drive generator.

9. The direct-drive wind turbine according to claim 1, and further comprising a locking device configured to lock the first arm in the first position.

10. The direct-drive wind turbine according to claim 1, wherein the rotor assembly of the direct-drive turbine is provided with a floor, and space below the floor configured to accept a cable extending towards the hub.

11. The direct-drive wind turbine according to claim 1 wherein the first arm is mounted to the mounting support, the first arm supporting the slip ring and the second arm during movement.

12. A direct-drive wind turbine comprising a nacelle configured to mount to a tower, said nacelle being provided with a direct-drive generator and a rotatable hub carrying turbine blades, wherein the direct-drive generator comprises an outer stator and an inner rotor assembly comprising a rotor and a shaft connecting the rotor to the rotatable hub, said nacelle having a first side facing the turbine blades and a second side facing away from the turbine blades, the nacelle further being provided with a slip ring for transferring power and/or signals from the nacelle to the rotatable hub, said slip ring being mounted coaxially with a centerline of the direct-drive generator at the second side of the direct-drive generator and is mounted on a first arm, the slip ring further being provided with a second arm, wherein an end of said second arm distal to the slip ring is configured to engage an element of the rotor assembly, wherein the first arm, the slip ring and the second arm are supported by a mounting support configured to move the first arm, the slip ring and the second arm to a first position in which the slip ring is aligned with the centerline of the direct drive generator and to a second position in which the slip ring is not aligned with the centerline of the direct drive generator to provide access to the hub, wherein the mounting support guides the assembly from a third position that is away from the first position to the first position, wherein the third position is between the first position and the second position for movement from the first position to the second position.

13. The direct-drive wind turbine according to claim 12, wherein the first arm is a swing arm configured to rotate about an axis located at an end of the first arm opposite of the slip ring.

14. The direct-drive wind turbine according to claim 13, wherein the first swing arm is affixed to a stationary part of the direct-drive generator such that the axis is stationary.

15. The direct-drive wind turbine according to claim 13, wherein the first arm is affixed to the stationary part such that the axis is tilted and the first arm moves towards the hub by gravity, and the first arm is blocked by a stop.

16. The direct-drive wind turbine according to claim 13, wherein the first swing arm is provided with an electrical connector leading to the slip ring and the second arm is provided with an electrical counter connector configured to connect to the electrical connector.

17. The direct-drive wind turbine according to claim 13, wherein the first arm is affixed to the stationary part such that the axis is tilted and the first arm moves towards the hub by gravity.

18. The direct-drive wind turbine according to claim 17, wherein the first arm, the slip ring and the second arm are configured such that gravity assists in keeping the slip ring away from the centerline of the generator if the slip ring is moved from the first position.

19. The direct-drive wind turbine according to claim 13, wherein the first arm is configured to extend at an angle in a range of −30° to 30° with respect to a horizontal plane.

\* \* \* \* \*